Dec. 27, 1966  B. GROB  3,293,884

POWER TRANSMITTING ELEMENT

Original Filed Aug. 3, 1961  2 Sheets-Sheet 1

INVENTOR.
Benjamin Grob
BY
Andrus & Starke
Attorneys

Dec. 27, 1966    B. GROB    3,293,884
POWER TRANSMITTING ELEMENT
Original Filed Aug. 3, 1961    2 Sheets-Sheet 2
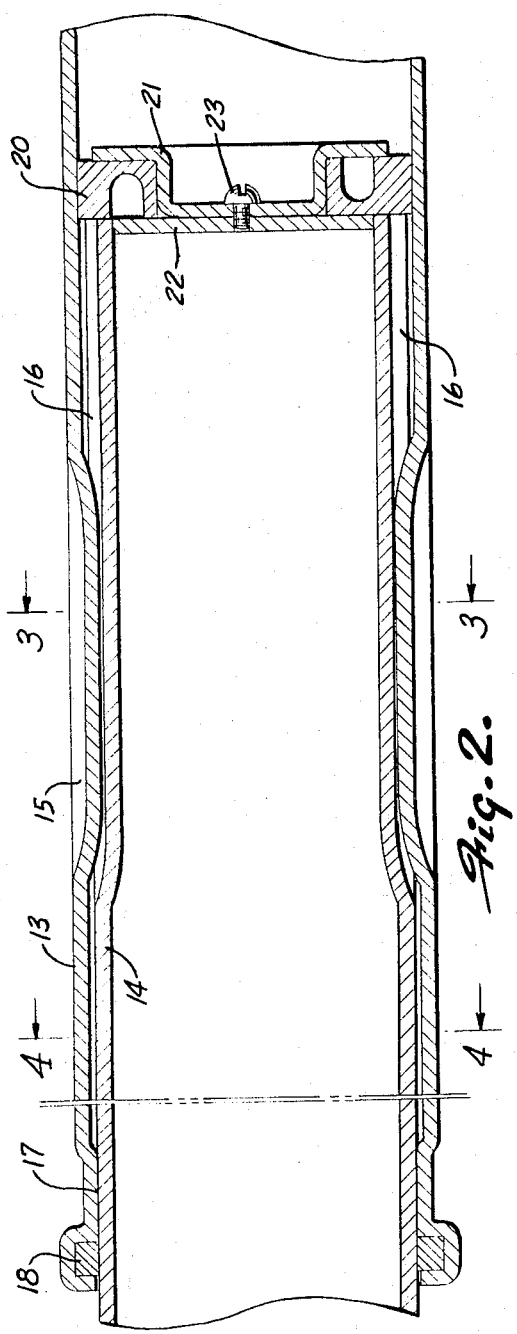
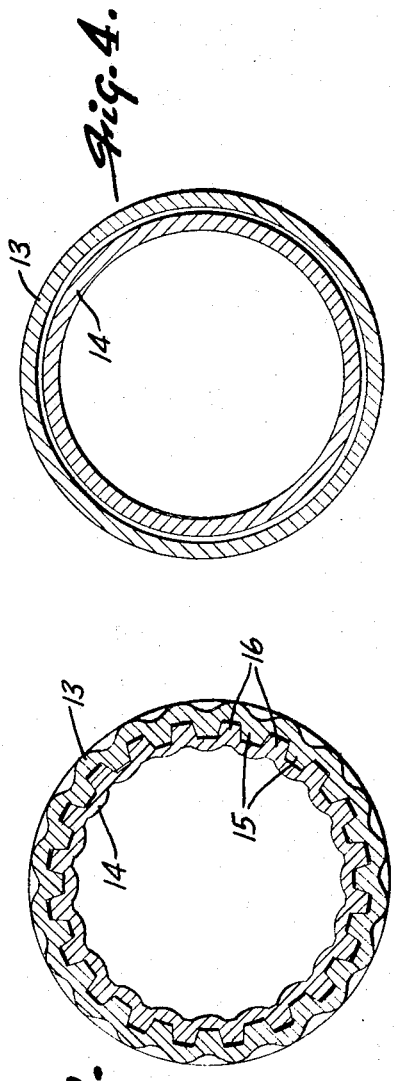
INVENTOR.
Benjamin Grob
BY Andrus & Starke
Attorneys

United States Patent Office 3,293,884
Patented Dec. 27, 1966

3,293,884
POWER TRANSMITTING ELEMENT
Benjamin Grob, Grafton, Wis., assignor to Grob Inc., Grafton, Wis., a corporation of Wisconsin
Original application Aug. 3, 1961, Ser. No. 129,073. Divided and this application Sept. 1, 1965, Ser. No. 484,269
2 Claims. (Cl. 64—23)

This application is a division of applicant's copending application Serial No. 129,073, filed August 3, 1961, and now abandoned.

This invention relates to an axially grooved power transmitting element of tubular form.

The invention is adapted for general use in the formation of axially extending gear teeth, splines or grooves in either the external or internal surface of a tubular element that cooperate with a similarly contoured member to transmit power.

The basic concept of the present invention resides in the use, as a power transmitting element, of a tubular member having gear teeth, splines or grooves formed in either the external or internal surface thereof by a cold forming process which effects the finished contoured form of the teeth, splines or grooves by deformation of the tubular member without the removal of material therefrom.

An object resides in the provision of a new and improved power transmitting coupling composed of a pair of telescopically arranged tubular member in which circumferentially spaced axially extending matching teeth, splines or grooves are formed on the adjacent surfaces of the housing and housed members by a repetitive cold forming process in which no material is removed from either member.

Another object resides in the provision of a new and improved power transmitting coupling composed of a pair of telescopically arranged tubular members in which the circumferentially spaced axially extending matching teeth, splines or grooves on the adjacent surfaces of the housing and housed members are produced by a repetitive cold forming process and are in finished form at the completion of the forming operation.

Other objects and advantages, either expressed or implied, will become apparent from the following description of an illustrative embodiment of the present invention.

In the drawings:

FIG. 2 is a fragmentary vertical longitudinal sectional view taken through the assembled splined inner and outer tubes of a power transmitting coupling;

Figure 1:
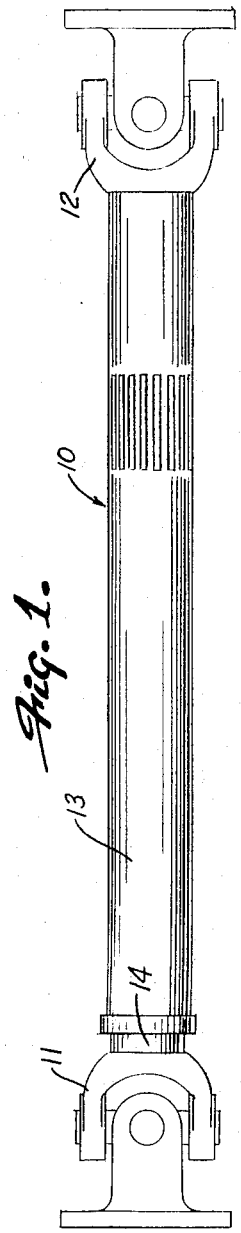
FIG. 1 is a top plan view of a power transmitting coupling constructed in accordance with the teachings of the present invention.

FIG. 3 is a vertical transverse sectional view taken substantially on the line 3—3 of FIG. 2 showing the relative positioning between the splined portion of the telescopically arranged tubes that form the power transmitting connection therebetween; and FIG. 4 is a vertical transverse sectional view taken on line 4—4 of FIG. 2 showing the relationship between the unsplined portions of the telescopically arranged tubes.

The present invention is predicated, in part, on the disclosure contained in U.S. Letters Patent No. 2,715,846 issued on August 23, 1955 to Ernst and Benjamin Grob. The subject patent was directed to a method of incrementally forming circumferentially spaced axially extending grooves in the outer surface of a solid cylindrical body. The desired cross-sectional form of the grooves was dictated solely by the selected cross-sectional form of the ribbed rollers that respectively applied a penetrating rolling force on surface of the solid cylindrical body.

While the present invention utilizes the cold rolling process disclosed and claimed in the above-mentioned patent, it constitutes an improvement thereon by reason of the fact that the present invention affords a new and improved axially grooved tubular power transmitting element in which the circumferentially spaced axially extending teeth, splines or grooves may be selectively formed in either the inner or outer surface of a tubular member. In the practice of the present invention, the form of the teeth, splines or grooves, selectively formed in the inner or outer surface of the tubular member requires the cooperative relationship between circumferentially spaced axially extending grooves in a workpiece supporting mandrel and the surface of the means by which deforming pressure is repetitively applied to the outer surface of the tubular member.

The embodiment of the present invention, chosen for illustrative purposes, in FIGURE 1 of the accompanying drawings, comprises a propeller shaft 10 that serves as a connecting member between a pair of universal joints 11 and 12 that form a portion of a power transmission in a motor vehicle.

The propeller shaft 10 is composed of a pair of telescopically arranged tubular members 13 and 14 respectively forming housing and housed tubes. One end of the housed member 14 is fixedly attached to one element of the universal joint 11 with the free end thereof slidably receivable in the tubular member 13 which has one of its ends fixedly attached to one element of the universal joint 12.

The tubular members 13 and 14 are respectively provided with matching splines 15 and 16 to permit the required relative axial movement between them in the power transmission.

The inner end portion of the outer tubular member 13 is swaged inwardly to form a bearing surface 17 which is in engagement with the outer surface of the inner tubular member 14 and rides along the member 14 as the tubular members slide or telescope relative to each other.

As best shown in FIG. 2, the end of outer tubular member 13 is bent outwardly, defining an internal recess or groove which houses an annular seal 18.

In addition, an annular seal 20 can be located on the inner end of inner tubular member 14 and is retained in position by a cap 21 which is secured to the end wall 22 of tubular member 14 by screw 23. Seal 20 prevents the entry of foreign material between the tubular members 13 and 14.

Spline 15 in outer member 13 has a substantially smaller axial length than spline 16 in the inner member 14, as illustrated in FIG. 2. This construction, in which spline 15 is smaller in length than spline 16, enables the propeller shaft to have substantial axial movement and yet the length of contact between the tubular members in the splined area is limited so that the tendency of the member to bind under heavy torque is minimized.

The tubular members 13 and 14 are in contact with each other only at the area of the spline 15 and at the location of the bearing 17, and the tubular members are spaced apart, as shown in FIG. 2, at locations between these two positions of contact. As bearing surface 17 is spaced a substantial distance along the length of tube 13 from the spline 15, increased rigidity is provided, thereby enabling the tubular members to telescope with long axial movement without kinking or binding. This is a distinct advantage over the ordinary splined propeller shaft which has only limited telescopic movement because the area of contact between the members constitutes only the short length of spline.

The use of the hollow tubular members 13 and 14 provides distinct advantages in the design of a vehicle propeller shaft over the use of bar stock which is machined to provide the spline connection. Torque is best transmitted by tubular members, for under heavy reverse torque load and side load, the relatively large diameter tubular members will more effectively resist the stress and increase the duration of use before failure. Moreover, due to the inherent elasticity of a tubular member, the spline teeth can retreat or push out under torque load so that all of the spline teeth will be in engagement and take the load regardless of any possible inaccuracy in the formation of the teeth.

While the invention has been described in considerable detail in the foregoing specification, it is to be understood that various changes may be made in its embodiment without departing from or sacrificing any of the advantages hereinafter claimed.

I claim:

1. A power transmitting coupling, comprising a tubular housing member having a substantially uniform wall thickness throughout its length and having an internal and external spline, a tubular housed member having a substantially uniform wall thickness throughout its length and having an internal and external spline, the inner end of the housed member being telescopically disposed within the inner end of the housing member and the internal spline of said housing member matching and engaging the external spline of said housed member, the spline of said housing member having a substantially shorter axial length than the spline of said housed member, and universal joint means secured to the outer end of each of said tubular members, the inner end portion of the housing member being deformed radially inward to define an annular bearing spaced axially from the spline on said housing member, said housing member and housed member being in contact with each other at the location of the matching splines and at the location of the bearing and spaced out of contact between the location of said matching splines and said bearing.

2. A power transmitting coupling, comprising a tubular outer housing member having a substantially uniform wall thickness throughout its length and including a generally cylindrical section and a splined section, a tubular inner housed member slidably disposed within the outer housing member and having a substantially uniform wall thickness throughout its length and including a generally cylindrical section and a splined section, the external diameter of the cylindrical section of the inner housed member being smaller than the internal diameter of the outer housing member to provide a clearance therebetween, the splined section of the outer housing member having a substantially shorter axial length than the splined section of the inner housed member and said splined sections being in mating engagement, the diameter of the outer periphery of the splined section of the inner housed member being substantially equal to the external diameter of the cylindrical section of the inner housed member, the splines in the splined section of the outer housing member comprising a series of alternate ribs and grooves and the radial distance from the top of the ribs to the bottom of the grooves being greater than the width of said clearance, and a bearing located on the inner surface of the cylindrical section of the outer housing member and disposed in engagement with the outer surface of the cylindrical section of the inner housed member, said bearing being spaced axially a substantial distance from the splined section of the outer housing member.

References Cited by the Examiner
UNITED STATES PATENTS

| | | | |
|---|---|---|---|
| 1,644,800 | 10/1927 | Urschel | 64—17 |
| 1,844,257 | 2/1932 | Lincoln | 64—23 |
| 2,067,282 | 1/1937 | Padgett | 64—1 |
| 2,072,090 | 3/1937 | Anderson | 64—23 X |
| 2,116,290 | 5/1938 | Spicer | 64—23 |

FRED C. MATTERN, JR., *Primary Examiner.*

HALL C. COE, *Examiner.*